March 5, 1968  R. B. TILNEY, SR  3,371,685
THREE-WAY VALVE WITH BUILT-IN PRESSURE CONTROL
Filed June 8, 1964
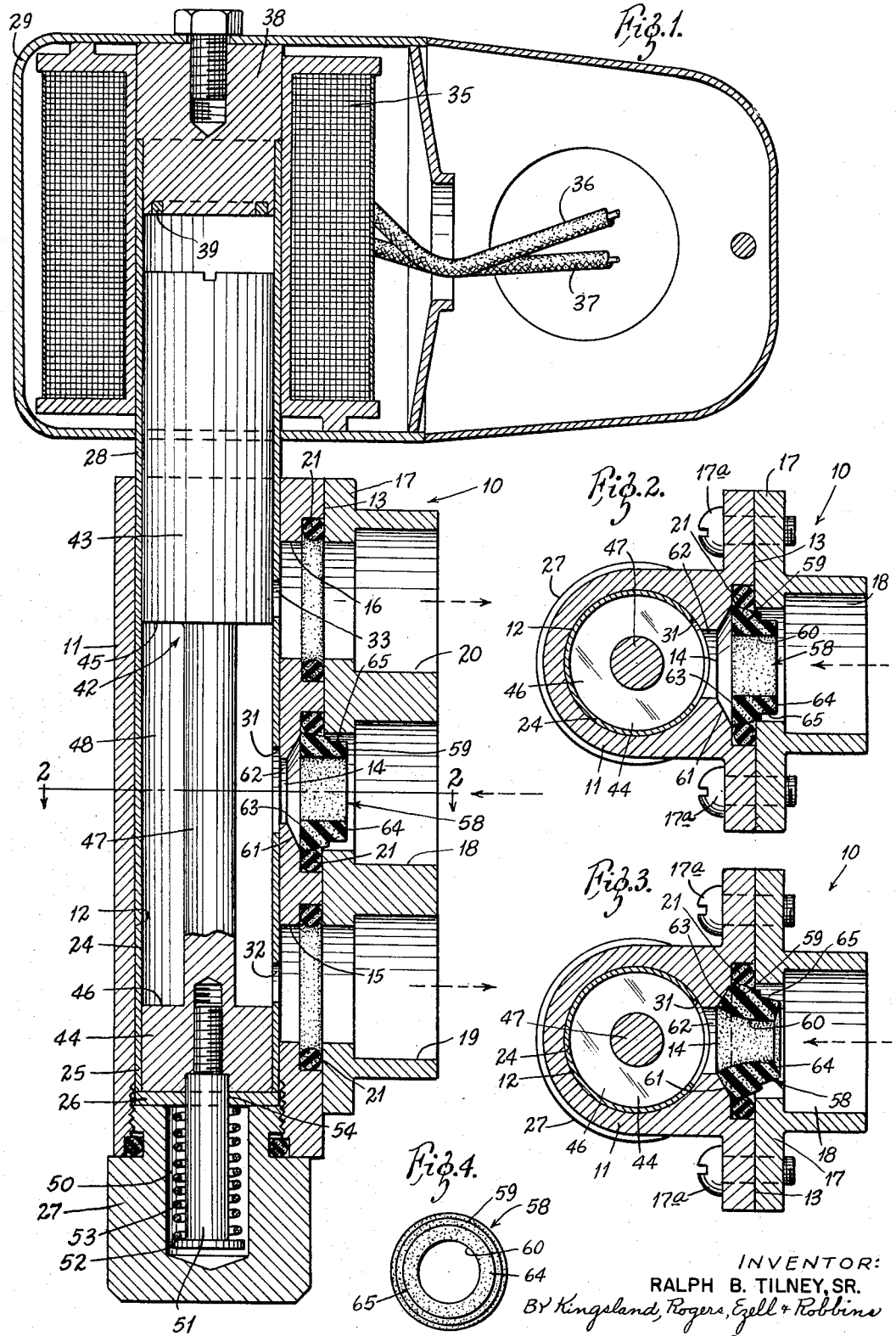
INVENTOR:
RALPH B. TILNEY, SR.
BY Kingsland, Rogers, Ezell & Robbins
ATTORNEYS

United States Patent Office 3,371,685
Patented Mar. 5, 1968

3,371,685
THREE-WAY VALVE WITH BUILT-IN
PRESSURE CONTROL
Ralph B. Tilney, Sr., Clayton, Mo., assignor to Alco Controls Corporation, a corporation of Missouri
Filed June 8, 1964, Ser. No. 373,180
1 Claim. (Cl. 137—625.11)

This invention relates to a three-way valve and particularly to a three-way valve having an inlet connected to a liquid supplied under variable pressure and having two outlets with means to alternately establish communication between the inlet and one of the outlets. The invention specifically relates to such a three-way valve that incorporates a flow control on the inlet side to regulate the pressure difference between inlet and outlet. The flow control thereby maximizes this pressure difference under which the valve must function.

This valve may be used in any system where there is a liquid supply and means are needed for directing the flow of supply liquid selectively to alternate circuits. An example of such a system is one having a heating and cooling coil through which water is circulated to heat or cool a building space as one circuit for the water with the alternate circuit being a bypass pipe that bypasses the coil.

The valve may be any conventional three-way valve, but for illustration, a slide valve is shown and described. It will be noted that in the slide valve there is a particular problem relating to the difference between inlet and outlet pressure.

The slide valve has a valve chamber into which the inlet port and two outlet ports are connected for fluid communication. A piston member reciprocates within the valve chamber and has a passage through it that maintains constant communication with the inlet port. The passage communicates with alternate ones of the outlet ports depending upon the position of the piston. Motor means are provided for shifting the piston between its alternate positions and by this means the inlet port is alternately connected to the outlet ports. Since the piston slides within the chamber, even though its ends are large enough to substantially fill the chamber at the longitudinal ends of the fluid passage, there is some pressure leakage along the sides of these large ends. This pressure leakage causes pressures to be exerted on the sides of the piston, but the pressure is relieved at the outlet ports. Consequently there is a net side pressure forcing the piston against the side of the chamber. As long as the pressure within the chamber is below a predetermined maximum value, the piston slides properly, but if the pressure is too high, the piston binds against the side of the pressure chamber.

To control the pressure difference between the inlet and outlet ports, and the pressure within the chamber, the valve is provided with a flow control on its inlet side. The flow control is in the form of a flexible member having an opening through it through which the liquid passes when entering the chamber. The flexible member also has a face exposed to this inlet pressure, and when the inlet pressure rises above a predetermined maximum, it deflects the flexible member and reduces the size of the opening through which the liquid passes. This increases the pressure drop through the opening, and keeps the pressure difference across the valve below the maximum permissible.

The general object of this invention is to provide a combined three-way valve and flow control for regulating the pressure difference between inlet and outlet to the valve.

An object of this invention is to provide a three-way valve having a slidable piston member for alternately connecting the inlet to the valve to either of two outlets, with means to control the pressure difference across the valve, as well as within the valve chamber, to prevent binding of the piston within the chamber.

A particular object of the invention is to provide a three-way piston valve with flow control means on the inlet side of the valve so that pressures within the valve housing can be kept below a predetermined value above which binding of the piston member occurs.

Another object of the invention is to provide a three-way valve with a flow control, wherein several such controlled valves may be connected to a fluid circulation system and the several flow controls will cause the flow through all valves to be substantially equal. Normally, in such a system, the valve furthest from the circulating pump must operate with reduced inlet pressure and flow.

In the drawing:

FIGURE 1 is a view in vertical section through the center of the valve;

FIGURE 2 is a view in section taken along the line 2—2 with the flow regulator under relatively low pressure inlet conditions;

FIGURE 3 is a view in section taken along the line 2—2 of FIGURE 1 with the flow regulator subjected to relatively high inlet conditions; and FIGURE 4 is an elevation view of the flow regulator as viewed from the inlet side thereof.

Referring now to the drawing, this valve 10 comprises a housing 11 having a longitudinal cylindrical opening 12 through it. An exterior side 13 of the housing is flattened. There is an inlet port 14 through the flat side 13 and two outlet ports 15 and 16, all extending through to the cylindrical opening 12. A pipe fitting manifold 17 is fastened by bolts 17a to the flat side 13. The manifold 17 has countersunk openings 18, 19 and 20 communicating with the ports 14, 15 and 16, respectively. Each of the openings 18, 19 and 20 is adapted to receive the end of a water pipe. There are O-ring seals 21 around the ports 14, 15 and 16, between the housing 11 and the manifold 17.

A hollow cylindrical sleeve or tube 24 is fitted within the opening 12 in the housing 11. The sleeve 24 is stationary in the opening 12. The lower end 25 of the sleeve 24 is blocked by a plate 26 held in place by a cap 27 threaded into the lower end of the housing 11. Toward its other end, the sleeve 24 has an extension 28 beyond the upper end of the housing 11. The extension 28 is received within a solenoid housing 29.

The sleeve 24 has a relatively large opening 31 through its side communicating with the inlet port 15 and relatively smaller openings 32 and 33 communicating with the outlet ports 15 and 16.

Within the housing 29, there is a solenoid coil 35 of standard construction with conductors 36 and 37 for connecting the solenoid to a suitable control switch. The sleeve 28 extends into the inner side of the coil 35, and there is a block 38 fastened to the housing 29 and covering the upper end of the sleeve 28. A resilient stop ring 39 is mounted in the lower side of the block 38.

A piston or slide 42 is mounted within the sleeve 24 and is slidable therein. The slide 42 has a cylindrical upper end 43 and a cylindrical lower end 44. These cylindrical ends 43 and 44 fit within close tolerances inside the sleeve 24, but the fit is not tight because the piston 42 must be free to slide within the sleeve 24.

The end 43 has an inner wall 45 and the end 44 has an inner wall 46. Between these ends 45 and 46, there is a connecting stem 47 of reduced diameter so there is a space 48 between the stem 47 and the inner wall of the sleeve 24 defining a fluid passage. The length of the fluid passage 48 as defined by the end wall 45 and 46 is less than the distance between the openings 32 and 33 through the sleeve 24.

The chamber defined by the sleeve 24, the plate 26, and the block 38 is fluid tight because the plate 26 is permanently attached to the lower end of the sleeve 24 and the block 38 is permanently attached to the upper end of the sleeve 24. The passage 48 around the stem 47 is generally confined between the end walls 45 and 46 because of the close fit of the piston ends 43 and 44 with the inner side wall of the sleeve 24. However, some leakage can occur between the inner side wall of the sleeve 24 and the ends 43 and 44 of the piston.

There is a recess 50 in the end cap 27, and a rod 51 which is threaded into the lower end 44 of the piston 42 extends into the recess 50. The rod 51 has a flange 52 on its lower end that serves as a spring seat. A compression spring 53 bears against the flange 52 at one end and at its other end against the end plate 26. The rod 51 is slidable through a hole 54 in the plate 26. Thus the spring 53 tends to pull the piston member 42 downwardly until its lower end 44 stops against the plate 26.

The piston 42 is drawn upwardly whenever the solenoid coil 35 is energized upon the closing of a switch or switches to which the wires 36 and 37 are connected. The solenoid draws the piston 42 upwardly until its upper ends 43 contacts the rubber bumper 39. This moves the passage 48 between the walls 45 and 46 upwardly blocking the opening 32 and freeing the openings 33 into communication with the passage 48 and therefore with the opening 31.

An example of how this valve is used will be described hereinafter, but it may be stated now that it is principally used as a three-way water valve wherein water is supplied through a pipe to the inlet port 14 and is to be discharged from the valve through a selected one of the outlets 32 or 33. To select one of these outlets 32 or 33, the piston 42 must be slidable between the positions shown in FIGURE 1 in which the inlet port 14 communicates through the passage 48 with the outlet port 15, and the upper position caused by energization of the solenoid 35 in which the inlet port 14 communicates with the outlet port 16 and the other outlet port 15 is blocked by the end 44 of the piston 42.

The inlet pressure through the inlet port 14 determines the pressure within the valve chamber. Since there is some leakage between the inner side wall of the sleeve 24 and the ends 43 and 44 of the piston 42, this inlet pressure is also felt along the sides of the ends 43 and 44. When one of the ends, such as the upper end 43, covers an opening 33 leading to an outlet port, as shown in FIGURE 1, the side of the piston end 43 adjacent the opening 33 is relieved of inlet pressure. Consequently, the inlet pressure is exerted primarily on the side of the piston end 43 opposite the opening 33 and there is a net side force on the piston member pressing it laterally against the opposite side wall of the sleeve 24. This net side force is no problem so long as it is kept below a predetermined maximum value, but if the force gets too high, it causes binding of the piston member 42 and prevents it from sliding to shift the valve between the outlet ports.

To control the pressure difference across the valve and to prevent this binding of the piston 42, there is a flow control 58 on the inlet side of the chamber 48. The flow control 58 comprises a flexible member 59 of rubber or plastic having a passage 60 through it. Toward the chamber 48 from the flexible member 59, the inlet port 14 has an annular sloping wall 61 leading to an opening 62. The flexible member 59 has a flat side 63 next to the sloping wall 61. On its opposite side, the flexible member 59 has a flat face 64 exposed to inlet pressure in the manifold opening 18. The side wall 65 of the flexible member 59 is spaced from the side wall of the manifold opening 18 and is also exposed to inlet pressure. The purpose of the flow control 58 is to limit the pressure difference across the valve and reduce the pressure of the liquid within the chamber 48 to prevent binding of the piston 42.

This valve may be used in any system where the inlet is connected to a supply of liquid such as water and a selection between two outlets is needed. An example of such a system is the circulation of water through a coil for heating or cooling space in a building. In this kind of system when used, for example, to heat the building space, hot water is circulated through the coil and air is blown across the coil. As long as heating is needed, the hot water should be circulated through the coil and one of the valve outlets, such as the outlet 32, produces this circulation through the coil. When heating is not needed, perhaps because of a response of a thermostatic control, the water should be circulated through a pipe that bypasses the coil, and for this bypass circulation, the water should flow through the other outlet port 16. Thus, the wires 36 and 37 may be connected to a thermostatic control that determines whether or not the solenoid coil 35 is energized. When heating is needed, the piston 42 occupies the position shown in FIGURE 1 because the solenoid coil 35 is not energized and water flows from the inlet port 14 through the chamber 48 to the outlet port 15 and thence through the coil and heats the room. When heating is not needed the solenoid coil 35 is energized, and the piston 42 is shifted upwardly closing the outlet port 15 and opening the outlet port 16. Water then flows from the inlet port 14 through the chamber 48 to the outlet port 16 and thence through the bypass pipe and does not heat the room.

In these systems, it has been found that the specification of various components may be conservative. This is particularly true of the pumps specified for circulating the water and supplying it to the inlet port 14. When the design is conservative, the pump capacity is great and it produces a pressure at the inlet port 14 that would be high enough to cause binding of the piston 42 except for the pressure control 58. With the flow control 58, however, the high pressure acts on the base 64 of the flexible member 59 and deflects the flexible member 59 to the position shown somewhat exaggerated in FIGURE 3. Thus, whenever the inlet pressure at the inlet port 14 is above a predetermined maximum, it causes some deflection of the flexible member 59 toward the position shown in FIGURE 3. The amount of deflection will, of course, depend upon the magnitude of the inlet pressure. When the flexible member 59 deflects, the diameter of the opening 60 is reduced, as clearly shown in the exaggerated illustration of FIGURE 3, creating a greater pressure drop in the liquid across the flexible member 59 as the liquid flows into the chamber 48. This causes the pressure within the chamber 48 to be lower than the pressure on the inlet side of the flexible member 59. The inclined wall 61 permits this deflection and also provides a stop for the flexible member 59.

Various changes and modifications may be made within the purview of this invention as will be readily apparent to those skilled in the art. Such changes and modifications are within the scope and teaching of this invention as defined by the claims appended thereto.

What is claimed is:

1. In a liquid circulation system having means to circulate the liquid under various pressures and having alternate circuits through which the liquid is to be circulated, a three-way valve having an inlet port for connection to the circulating means and having two separate outlet ports for connection to the alternate circuits, the valve comprising a housing, a chamber within the housing, the inlet and outlet ports opening through the side of the housing and communicating with the chamber, the inlet port being positioned between the two outlet ports, a piston slidable within the chamber, the piston having fluid-conducting space means for connecting the inlet with each outlet port, and of a length greater than the spacing between the outlet ports so that there is always communication between the inlet and one or both outlet ports, regardless of the position of the piston, motor means for sliding the piston for alternately establishing communication between the inlet port and each of the outlet ports, the piston having ends beyond the communication between the inlet ports and the outlet ports of substantially the same diameter as that of the chamber, there being sufficient leakage between the said ends of the piston and the side of the chamber to subject the said ends of the piston to liquid pressure within the chamber, the piston and chamber being free of mutually engageable liquid seals which would block the said leakage, part of the leakage pressure being relieved by an outlet port leaving a net lateral force pressing the piston against the side of the chamber, and means to limit the pressure within the chamber comprising a flow control on the inlet side of the chamber, the flow control comprising a flexible member having a passage through it for maintaining communication between the inlet port and the chamber, the flexible member having a face exposed to inlet pressure and being sufficiently flexible to deflect and reduce the diameter of the passage according to the magnitude of inlet pressure and accordingly increase the pressure drop through the opening.

References Cited

UNITED STATES PATENTS

| 2,781,058 | 2/1957 | Warhus | 138—45 |
| 3,089,509 | 5/1963 | Collins | 137—625.5 |

WILLIAM F. O'DEA, *Primary Examiner.*

H. COHN, *Assistant Examiner.*